(12) United States Patent
Sherman et al.

(10) Patent No.: US 7,795,842 B2
(45) Date of Patent: Sep. 14, 2010

(54) ADJUSTABLE CUT-OFF VOLTAGE FOR MOBILE DEVICE BATTERY

(75) Inventors: Itay Sherman, Hod Hasharon (IL); Eyal Bychkov, Hod Hasharon (IL); Eran Miller, Givataim (IL); Uri Ron, Tel Aviv (IL)

(73) Assignee: Modu Ltd., Kfar Saba (IL)

( * ) Notice: Subject to any disclaimer, the term of this patent is extended or adjusted under 35 U.S.C. 154(b) by 289 days.

(21) Appl. No.: 11/891,777

(22) Filed: Aug. 13, 2007

(65) Prior Publication Data

US 2009/0045779 A1 Feb. 19, 2009

(51) Int. Cl.
*H02J 7/00* (2006.01)
(52) U.S. Cl. .................. 320/132; 455/572; 455/573; 455/574
(58) Field of Classification Search .......... 320/114, 320/115, 128, 132, 134, DIG. 21; 455/573–574
See application file for complete search history.

(56) References Cited

U.S. PATENT DOCUMENTS

| 5,625,673 | A | 4/1997 | Grewe et al. |
| 5,628,055 | A | 5/1997 | Stein |
| 5,809,115 | A | 9/1998 | Inkinen |
| 5,893,037 | A | 4/1999 | Reele et al. |
| 5,907,815 | A | 5/1999 | Grimm et al. |
| 6,188,917 | B1 | 2/2001 | Laureanti |
| 6,201,867 | B1 | 3/2001 | Koike |
| 6,243,578 | B1 | 6/2001 | Koike |
| 6,477,357 | B1 | 11/2002 | Cook |
| 6,516,202 | B1 | 2/2003 | Hawkins et al. |

(Continued)

FOREIGN PATENT DOCUMENTS

EP 1871075 A1 12/2007

(Continued)

OTHER PUBLICATIONS

Michael Day et al., "Choose the Best Buck Boost Converter", EE Times-Asia, Mar. 16-31, 2007; http://www.ohararp.com/files/BUCK_BOOST_ARTICLE.pdf.

(Continued)

*Primary Examiner*—Edward Tso
*Assistant Examiner*—Ramy Ramadan
(74) *Attorney, Agent, or Firm*—Soquel Group LLC

(57) ABSTRACT

A power management system for a mobile electronic device, including a microprocessor for continually monitoring a voltage of a battery within a mobile electronic device, wherein the device can operate in either a standalone mode powered by the battery, or in an externally powered mode, and wherein the battery is charged when the device is in external power mode, and a power manager coupled with said voltage meter, for controlling operation of the device according to the following logic: if the monitored voltage falls below an upper turn-on threshold, UTOT, during operation of the device in standalone mode, but is above a lower turn-on threshold, LTOT, then automatically turning the device off, and enabling the device to be turned on in an emergency mode, wherein at least one emergency action is enabled, and if the monitored voltage falls below LTOT during operation of the device in standalone mode, then automatically turning the device off, and preventing the device from being turned on. A method is also described and claimed.

8 Claims, 4 Drawing Sheets

U.S. PATENT DOCUMENTS

| | | | |
|---|---|---|---|
| 6,640,113 B1 | 10/2003 | Shin et al. | |
| 6,690,947 B1 | 2/2004 | Tom | |
| 6,753,625 B2 | 6/2004 | Kelsey | |
| 6,898,283 B2 | 5/2005 | Wycherley et al. | |
| 6,907,264 B1 | 6/2005 | Sterkel | |
| 6,999,792 B2 | 2/2006 | Warren | |
| 7,034,604 B2 | 4/2006 | Minteer | |
| 7,085,542 B2 | 8/2006 | Dietrich et al. | |
| 7,194,285 B2 | 3/2007 | Tom | |
| 7,266,391 B2 | 9/2007 | Warren | |
| 2002/0090980 A1 | 7/2002 | Wilcox et al. | |
| 2002/0151327 A1 | 10/2002 | Levitt | |
| 2004/0132501 A1* | 7/2004 | Jiang | 455/573 |
| 2004/0233930 A1 | 11/2004 | Colby, Jr. | |
| 2004/0268005 A1 | 12/2004 | Dickie | |
| 2005/0070225 A1 | 3/2005 | Lee | |
| 2005/0159184 A1 | 7/2005 | Kerner et al. | |
| 2006/0003804 A1 | 1/2006 | Liu | |
| 2006/0069931 A1* | 3/2006 | Shin et al. | 713/300 |
| 2006/0105722 A1 | 5/2006 | Kumar | |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0079030 A1 | 4/2007 | Okuley et al. | |
| 2007/0161404 A1 | 7/2007 | Yasujima et al. | |
| 2007/0191076 A1* | 8/2007 | Hageman et al. | 455/574 |
| 2007/0288583 A1 | 12/2007 | Rensin et al. | |
| 2008/0009325 A1 | 1/2008 | Zinn et al. | |
| 2008/0026794 A1 | 1/2008 | Warren | |
| 2008/0040354 A1 | 2/2008 | Ray et al. | |
| 2008/0140886 A1 | 6/2008 | Izutsu | |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

OTHER PUBLICATIONS

Isidor Buchmann, "Batteries in a Portable World", Chapter 6—"The secrets of battery runtime", Apr. 2001; http://www.batteryuniversity.com/parttwo-31.htm.

Lon Schneider, "Enhance Battery Pack Performance with the Optimal Charger", Nov./Dec. 2006, "Battery Power Products & Technology", vol. 10, Issue 6; http://www.batterypoweronline.com/images/PDFs_articles_whitepaper_appros/Nexergy.pdf; http://www.nexergy.com/charger-basics.htm.

* cited by examiner

ADJUSTABLE CUT-OFF VOLTAGE FOR MOBILE DEVICE BATTERY

FIELD OF THE INVENTION

The field of the present invention is power management for electronic devices.

BACKGROUND OF THE INVENTION

When a cell phone battery loses its charge, the cell phone shuts down and cannot be turned on until its battery is sufficiently re-charged. For many cell phones, even if the phone is connected to an external power source, such as a charger, the phone still cannot be turned on until its battery is sufficiently re-charged.

Depending on circumstances, inability to turn on and use a cell phone after shut down may result in various kinds of damaging consequences, including monetary loss, illness, trauma and even life-threatening danger. It would certainly be advantageous to mitigate this problem.

Regarding power management, in addition to cell phones, many mobile electronic devices such as notebook and laptop computers, personal data assistants (PDAs), digital cameras, and music and video players, can be powered by internal batteries or by external power sources. The internal battery, or battery pack, of such a device provides a DC source of power, and enables the device to operate in a standalone mode. Alternatively, such a device may be connected to an external AC power source, which is transformed to a DC voltage using a suitable power adaptor. In addition, often such a device may be connected to a host computer, and is able to use the power from the host as a DC power source.

Generally, when such a device is connected to an external AC power source, or to a host computer, the voltage coming into the device may be used both to power the device, and to recharge the device's internal battery. When such a device is connected to a host computer using a Universal Serial Bus (USB) interface, for example, the host computer transmits power to the device during exchange of data. This transmitted power may be used for the device operation, and also for recharging its battery. Many devices today allow for fast recharging of batteries when the devices are connected to an external power source, even while the devices are operational.

Cell phone batteries and other device batteries are generally lithium ion batteries. Lithium ion batteries offer several advantages. They have high energy-to-weight ratios, they have no memory effect, and they have slow discharge when not in use. In this regard, reference is now made to FIG. 1, which is a prior art graph of discharge of a lithium-ion battery over time. The graph in FIG. 1 is taken from http://www.o-hararp.com/files/BUCK_BOOST_ARTICLE.pdf.

Discharge of a lithium ion battery or battery pack needs to be carefully monitored to prevent the end-of-discharge voltage from dropping below a safety level of 2.5V per cell. If allowed to self-discharge below 2.5V, a lithium ion battery undergoes irrecoverable capacity loss if it is stored in such condition for three months or longer. A protection circuit intrinsic to lithium ion battery packs prevents the batteries from being discharged below the safety level.

Cell phones and other such communication devices characteristically require high power bursts to perform certain operations. Cellular modems, for example, require series of short, high power bursts to achieve time division multiplexing. Due to these high power burst requirements, such a communication device may not be operable when using power received from a computer host, since the high power bursts may not be supported by the host, or may result in damage to the host. For such a communication device, external power received from a host may only be used to recharge the device's internal battery, but not for operation of the device.

Thus when a communication device's battery is low, the device can be connected to a host device to receive power for battery recharge, but cannot run on the host power supply. As such, the communication device cannot begin operating immediately after connection to the host, but must wait until the internal battery is sufficiently charged. Such wait may take several minutes. A cell phone, for example, which was shut down due to low battery charge, does not begin operating right away when it is connected to an external power source.

It would thus be of advantage to manage power of cell phones and other electronic devices, so as to enable turning on the cell phone, at least for emergency use, after it is shut down.

SUMMARY OF THE DESCRIPTION

The present invention manages power of cell phones and other electronic devices, so as to mitigate the problem of inability to turn oh and use a cell phone, even when the cell phone is connected to an external power source, by graduating power modes via an intermediate limited use mode prior to shut down mode.

Aspects of the present invention concern power management for a mobile electronic device in order to preserve life of a battery, or a battery pack, within the device. The device can run in standalone mode, or in an external power mode. When running in standalone mode the battery loses charge, and when running in external power mode the battery is re-charged by the external power source.

In order to prevent a shutdown of the device, without being able to turn the device back on, when the charge of the battery drops below a power-on reset (POR) threshold, a lockout power mode is enabled prior to the POR threshold being reached. The lockout power mode, referred to as a "provisional mode" and also as an "emergency mode", enables the device to be used only for limited actions and only for a pre-specified period of time. Thus a cellular telephone, for example, in provisional mode, may be turned on and used only for making emergency calls. This enables the user of the telephone to turn on the phone and call for help for a limited time period after his cell phone has shut down. In another scenario, the cellular telephone in provisional mode may be enabled for speed dial calls, thus enabling a child to turn on his phone and call his parents for a limited time period after the child's cell phone has shut down.

The present invention monitors the device's battery voltage and places the device in one of several power mode states, depending on the battery voltage and depending on whether the device is running on its internal battery or connected to an external power source. The transitions between power mode states are controlled so that a user of the device is able to make limited emergency-type actions for a limited time period after the device has been shut down.

There is thus provided in accordance with an embodiment of the present invention a method for power management for a mobile electronic device, including continually monitoring a voltage of a battery within a mobile electronic device, wherein the electronic device-can operate in either a standalone mode powered by the battery, or in an externally powered mode, and wherein the battery is charged when the device is in external power mode, and if the monitored voltage falls below an upper turn-on threshold, UTOT, during operation of the device in standalone mode, but is above a lower turn-on threshold, LTOT, then automatically turning the device off, and enabling the device to be turned on in an emergency mode, wherein at least one emergency action is enabled, and if the monitored voltage falls below LTOT during operation of the device in standalone mode, then automatically turning the device off, and preventing the device from being turned on.

There is moreover provided in accordance with an embodiment of the present invention a power management system for a mobile electronic device, including a microprocessor for continually monitoring a voltage of a battery within a mobile electronic device, wherein the device can operate in either a standalone mode powered by the battery, or in an externally powered mode, and wherein the battery is charged when the device is in external power mode, and a power manager coupled with said voltage meter, for controlling operation of the device according to the following logic: if the monitored voltage falls below an upper turn-on threshold, UTOT, during operation of the device in standalone mode, but is above a lower turn-on threshold, LTOT, then automatically turning the device off, and enabling the device to be turned on in an emergency mode, wherein at least one emergency action is enabled, and if the monitored voltage falls below LTOT during operation of the device in standalone mode, then automatically turning the device off, and preventing the device from being turned on.

There is additionally provided in accordance with an embodiment of the present invention a method for power management for a battery within a mobile electronic device, including controlling transitions from one power mode to another power mode for a mobile electronic device, wherein the device can run on an internal battery or on an external power source, and wherein the device may be placed into (i) a fully operation power mode where the device can be turned on and operates normally (Mode I), (ii) a provisionally operation power mode where the device can be turned on for a pre-specified amount of time and used only for one or more emergency operations (Mode II), (iii) a critically operational power mode where the device operates normally but cannot be turned on after it is turned off (Mode III), and (iv) a non-operation mode where the device is turned off and cannot be turned on (Mode IV), including transitioning from Mode I to Mode II when the device is running on the internal battery and the voltage of the battery drops below an upper turn-on threshold (UTOT), transitioning from Mode II to Mode IV when the device is running on the internal battery and the voltage of the battery drops below a lower turn-on threshold (LTOT), transitioning from Mode IV to Mode III when the device is running on the external power source and the voltage of the battery rises above a power-on reset threshold (POR), and transitioning from Mode III to Mode I when the device is running on the external power source and the voltage of the battery rises above LTOT.

There is further provided in accordance with an embodiment of the present invention a power management system for a mobile electronic device, including a power manager for controlling transitions from one power mode to another power mode for a mobile electronic device, wherein the device can run on an internal battery or on an external power source, and wherein the device may be placed into (i) a fully operation power mode where the device can be turned on and operates normally (Mode I), (ii) a provisionally operation power mode where the device can be turned on for a pre-specified amount of time and used only for one or more emergency operations (Mode II), (iii) a critically operational power mode where the device operates normally but cannot be turned on after it is turned off (Mode III), and (iv) a non-operation mode where the device is turned off and cannot be turned on (Mode IV), including circuitry for transitioning from Mode I to Mode II when the device is running on the internal battery and the voltage of the battery drops below an upper turn-on threshold (UTOT), transitioning from Mode II to Mode IV when the device is running on the internal battery and the voltage of the battery drops below a lower turn-on threshold (LTOT), transitioning from Mode IV to Mode III when the device is running on the external power source and the voltage of the battery rises above a power-on reset threshold (POR), and transitioning from Mode III to Mode I when the device is running on the external power source and the voltage of the battery rises above LTOT.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to methods and systems for power management of electronic devices. Multiple power modes for a device are managed, including a fully operation power mode, a non-operational (shut-down) power mode, and a provisional power mode. The provisional power mode enables the device to be turned on for limited emergency-type use, for a short period of time. Transitions between power modes are governed by increases and decreases in battery voltage, and by the device being connected to or disconnected from an external power source.

Figure 2:
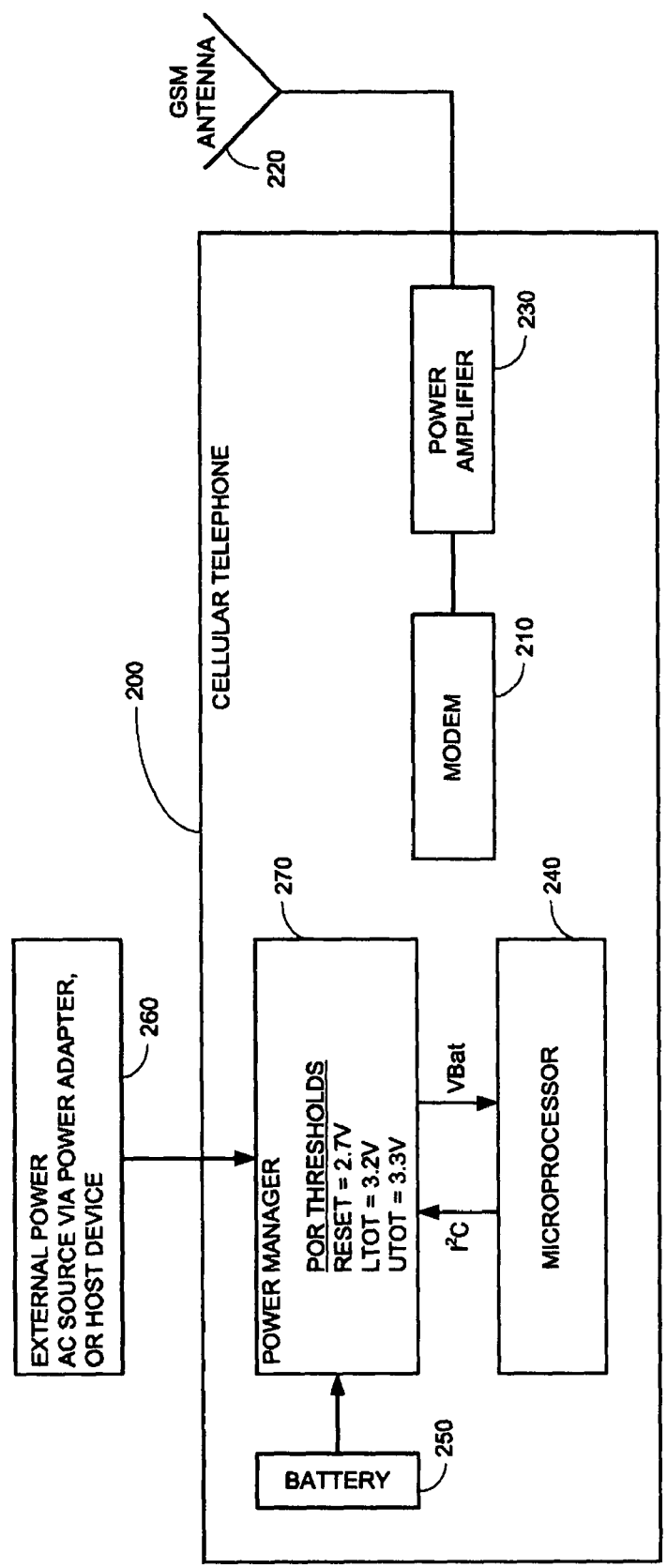
FIG. 2 is a simplified block diagram of a power management system, for preserving life of a battery in a cellular telephone, in accordance with an embodiment of the present invention.

Reference is now made to FIG. 2, which is a simplified block diagram of a power management system, for preserving life of a battery in a cellular telephone, in accordance with an embodiment of the present invention. Shown in FIG. 2 is a cellular telephone 200 which includes a modem 210 for transmitting and receiving digital audio signals via a GSM antenna 220. A power amplifier 230 is used to amplify signals transmitted by antenna 220. Cellular telephone 200 operates under control of a dedicated microprocessor 240.

Cellular telephone 200 has an internal battery 250 for supplying power. In addition, cellular telephone 200 has an external power adapter 260, for connecting cellular telephone 200 to an external source such as an AC electrical socket, or to an external device, such as a computer, which is able to supply some of its own power to cellular telephone 200.

Cellular telephone 200 may operate in a standalone mode, powered by battery 250. Alternatively, cellular telephone 200 may operate in an external power mode, powered by a external source. In accordance with an embodiment of the present invention, battery 250 is a re-chargeable lithium ion battery, and generally when cellular telephone 200 operates in external power mode, some of the external power is used to charge battery 250.

The voltage on battery 250, denoted by VBat, changes continuously with time. Without being re-charged, VBat for a lithium ion battery typically decays according to a discharge curve such as that shown in FIG. 1. Cellular telephone 200 includes a power manager 270, for ensuring that cellular telephone 200 is shut down when VBat falls below a reset threshold, in order to avoid damage to battery 250 and to cellular telephone 200.

In accordance with an embodiment of the present invention, power manager 270 includes logic for a lockout mechanism that is functional when LTOT<VBat<UTOT, for pre-defined lower and upper turn-on thresholds LTOT and UTOT, respectively, and cellular telephone 200 is not connected to an external power source. The lockout mechanism serves to put cellular telephone 200 into a provisional mode, also referred to as an emergency mode, in which operation of cellular telephone 200 is limited to one or more emergency functions. Emergency functions may include inter alia making an emergency phone call, and making a speed dial phone call.

In an embodiment of the present invention, LTOT is a threshold used in prior art power management systems, below which cellular telephone 200 cannot be turned on, and UTOT is slightly higher than LTOT. Sample settings are LTOT=3.2V and UTOT=3.3V. The provisional mode of the present invention enables cellular telephone 200 to shut down methodically and in a controlled manner, so that it can be turned on for emergency calls after being shut down.

Power manager 270 controls cellular telephone 200 in accordance with TABLE I. As indicated in the table, when VBat drops below 2.7V, referred to as a "power-on reset" (POR) threshold, then power manager 270 shuts down cellular telephone 200 and prevents it from being turned on. This protects battery 250 from suffering permanent damage. Generally, when VBat drops below 2.7V, power manager 270 asserts a reset signal. The reset remains asserted until a safety period after VBat rises above 2.7V.

When VBat is between 2.7V and 3.2V, then power manager 270 enables cellular telephone 200 to operate in external power mode, but not in standalone mode. The threshold of 3.2V is referred to as a "turn-on" threshold, and also referred to herein as the lower turn-on threshold (LTOT). When cellular telephone 200 is operating in standalone mode and VBat falls below 3.2V, then power manager 270 turns cellular telephone off, and prevents it from being turned back on until VBat rises above 3.2V.

When VBat is above 3.2V then power manager 270 enables cellular telephone 200 to operate in external power mode, and when VBat is above 3.3V then power manager 270 enables cellular telephone 200 to also operate in standalone mode. The threshold of 3.3V is referred to herein as the upper turn-on threshold (UTOT).

However, when VBat is between 3.2V and 3.3V, then power manager 270 limits cellular telephone 200 to operate in provisional mode. In provisional mode cellular telephone 200 can be turned on for a pre-defined time period, such as 30 seconds, and can only be used for one or more emergency functions, such as making an emergency call.

Figure 1:
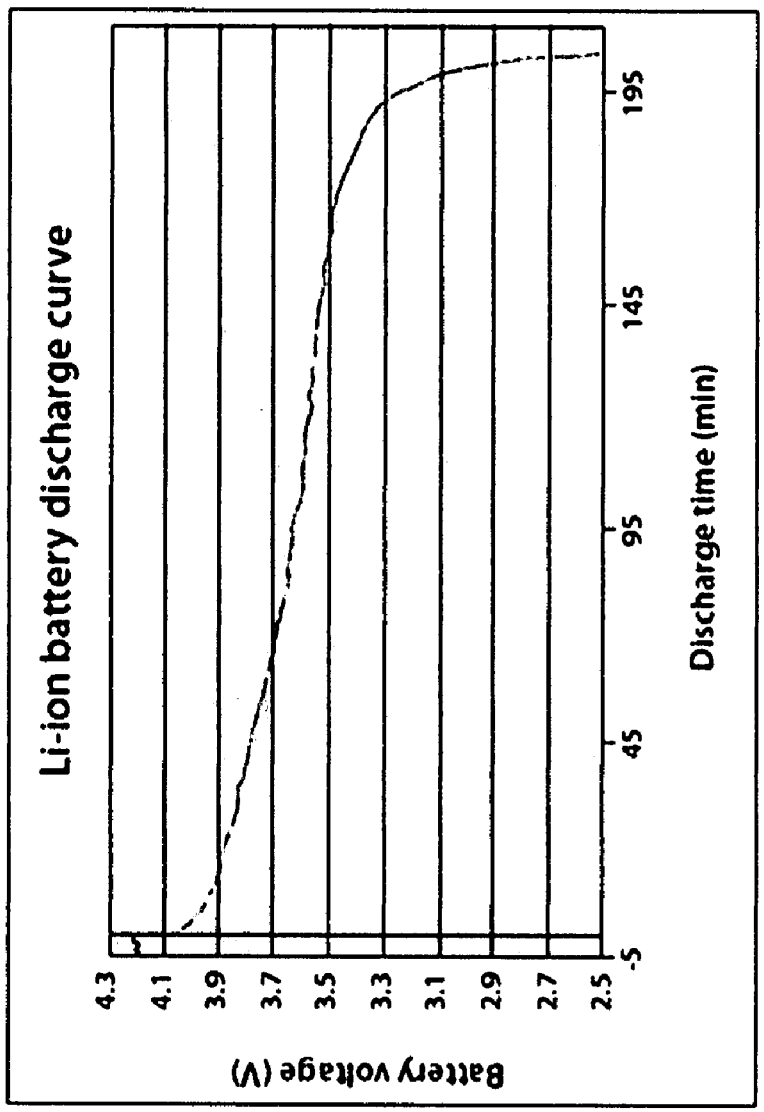
FIG. 1 is a prior art graph of discharge of a lithium-ion battery over time.

It will be appreciated by those skilled in the art, from the nature of the steep decline at the end of the discharge curve shown in FIG. 1, that raising the turn-on threshold for cellular telephone 200 from 2.7V to 3.3V has negligible impact on usage time. The drop from 3.3V to 2.7V occurs in a few minutes.

TABLE I

Power Management Logic

| Battery Voltage (VBat) | External Power Mode | Standalone Mode |
| --- | --- | --- |
| VBat ≦ 2.7 V | Device cannot be turned on. During operation, if the voltage drops below this threshold, then the device is automatically turned off. | |
| 2.7 V < VBat ≦ 3.2 V | Device cannot be turned on. During operation, device operates normally unless the voltage drops below POR threshold (2.7 V) | |
| 3.2 V < VBat ≦ 3.3 V | Device can be turned on. Device operates normally. | Device can be turned on in provisional mode. After a pre-defined time period, the device is automatically turned off. |
| VBat > 3.3 V | | Device operates normally. During operation, if the voltage drops below the upper threshold (3.3 V), then the device is automatically turned off. |

It will further be appreciated by those skilled in the art that the parameter values POR=2.7V, LTOT=3.2V and UTOT=3.3V are example values, and that other values for these parameters are within the scope of the present invention.

Figure 3:
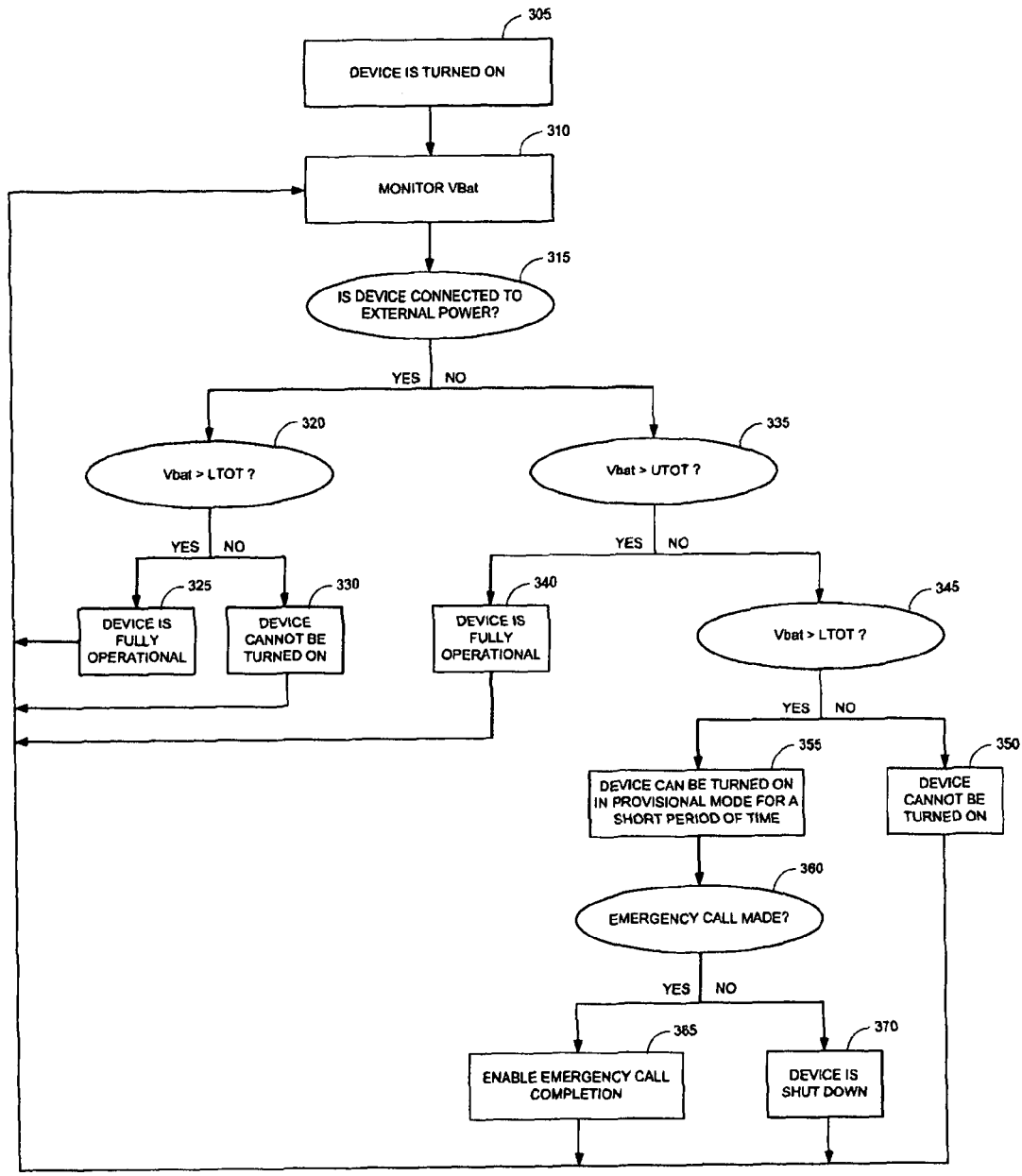
FIG. 3 is a simplified flowchart of a method for preserving life of a battery in a cellular telephone, in accordance with an embodiment of the present invention.

Reference is now made to FIG. 3, which is a simplified flowchart of a method for preserving life of a battery in a cellular telephone, in accordance with an embodiment of the present invention. At step 305 the telephone is turned on. At step 310 the voltage of a battery in the telephone is continually monitored. At step 315 a determination is made whether the telephone is connected to an external power source.

If the telephone is connected to an external power source, then its internal battery is being charged. At step 320 a further determination is made whether the battery voltage is higher than a lower turn-on threshold, denoted LTOT. If so, then at step 325 the telephone is power controlled so as to be fully operational. If not, then at step 330 the telephone is power controlled so as to be able to operate, but cannot be turned on after it has been turned off.

Referring back to step 315, if the telephone is not connected to an external power source, then it is running in standalone mode and being powered by its internal battery. The charge on its internal battery is being drained. At step 335 a determination is made whether the battery voltage is higher than an upper turn-on threshold, denoted UTOT. It so, then at step 340 the telephone is power controlled so as to be fully operational. If not, then at step 345 a further determination is made whether the battery voltage is higher than the lower turn-on threshold, LTOT. If not, then at step 350 the telephone is power controlled so that it cannot be turned on.

Referring back to step 345, if the battery voltage is higher than LTOT, then at step 355 the telephone is power controlled so as to turn on to operate only in a limited provisional mode, and only for a pre-specified short period of time. When operating in provisional mode, only limited use of the telephone is enabled. Generally, use of the telephone is limited to one or more emergency actions. An emergency action may be making an emergency phone call. An emergency action may also be making a speed dial call. This would enable a child to call his parents, for example, if his cell phone battery runs low.

When the telephone is operating in provisional mode, and a person uses the telephone to make a phone call, a determination is made at step 360 whether or not the call is an emergency call. If so, then the call is enabled at step 365. If not, the telephone is shut down at step 370.

The voltage on the telephone battery continually changes. The battery's charge decreases when the telephone is operating in standalone mode, and the charge increases when the telephone is connected to an external power source. The flowchart of FIG. 3 continually returns to step 310 to monitor the voltage and power manage the telephone accordingly.

Figure 4:
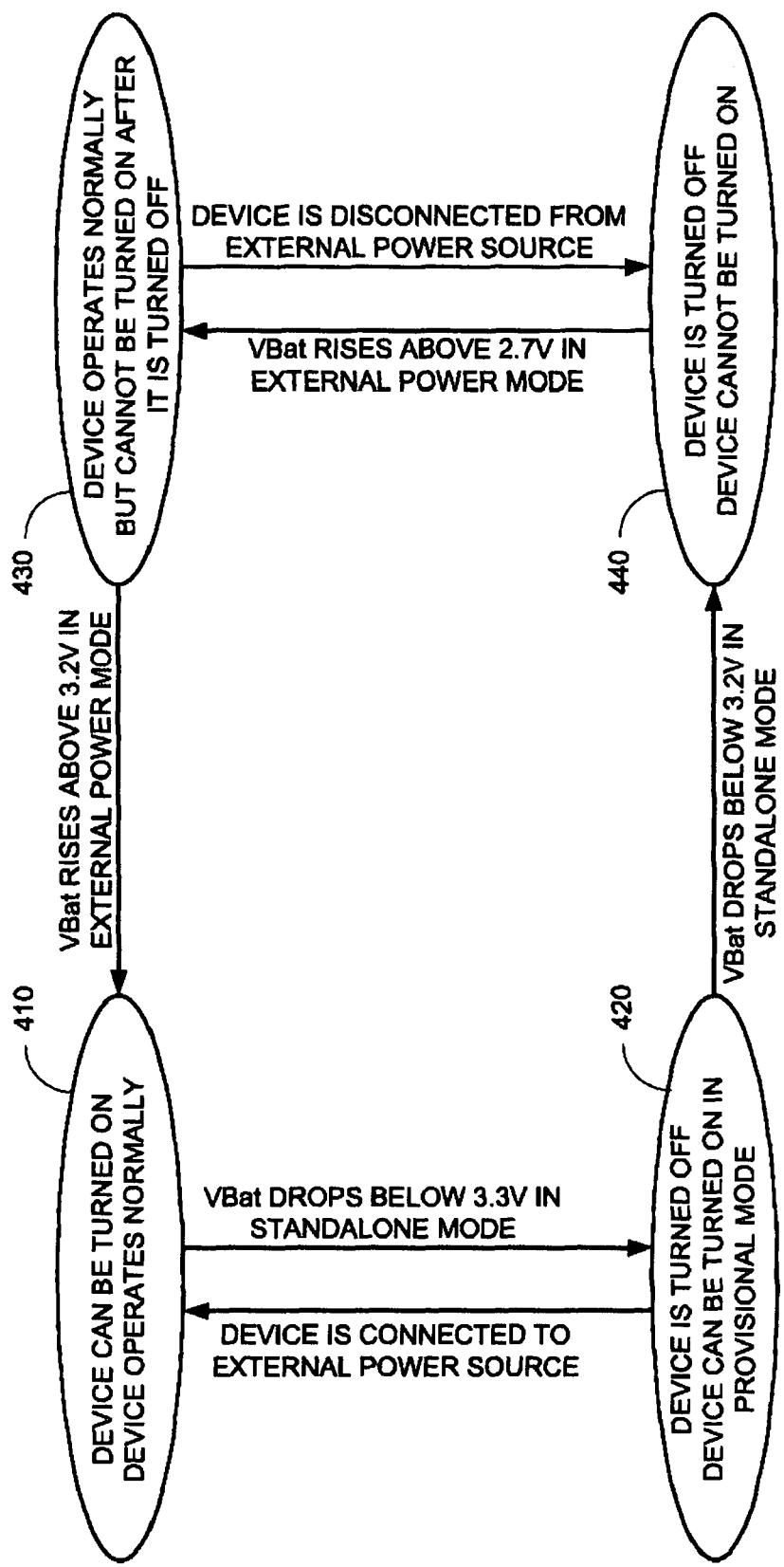
FIG. 4 is a simplified state transition diagram for power modes of a cellular telephone, in accordance with an embodiment of the present invention.

Reference is now made to FIG. 4, which is a simplified state transition diagram for power modes of a cellular telephone, in accordance with an embodiment of the present invention. As shown in FIG. 4, cellular telephone 200 (FIG. 2) can be in one of four power modes; namely,

- a fully operational power mode 410, wherein the cellular telephone can be turned on and operates normally;
- a provisionally operational mode 420, wherein the cellular telephone can be turned on for a pre-specified amount of time, such as 30 sec., and used for one or more emergency actions;
- a critical mode 430, wherein the cellular phone is operational, but cannot be turned on once it is turned off; and
- a non-operational mode 440, wherein the cellular telephone is shut down and cannot be turned on.

State transitions from one power mode to another in FIG. 4 occur when the battery voltage, VBat, drops below or rises above one of the thresholds POR, LTOT and UTOT. Voltage drops occur when the cellular telephone is operating in standalone mode, and the charge on its battery is being drained. Voltage rises occur when the cellular telephone is operating in external power mode, and its battery is being charged by an external power source.

State transitions in FIG. 4 also occur when the cellular telephone is connected to or disconnected from an external power source. The state transitions summarized in FIG. 4 are controlled by power manager 270 (FIG. 2) and correspond logically to the flowchart of FIG. 3.

In reading the above description, persons skilled in the art will realize that there are many apparent variations that can be applied to the methods and systems described. In particular, the power management system described hereinabove with reference to FIG. 2, and the power management method described hereinabove with reference to FIG. 3 apply to a wide variety of other mobile electronic devices, in addition to cellular telephones. Among the actions supported by such devices, certain actions among them are designated as being emergency actions. When the devices are placed into provisional power mode (step 355 of FIG. 3), only the emergency actions are enabled, and only for a pre-specified period of time.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for power management for a mobile electronic device, comprising:
   continually monitoring a voltage of a battery within a mobile electronic device, wherein the electronic device can operate in either a standalone mode powered by the battery, or in an externally powered mode, and wherein the battery is charged when the device is in external power mode;
   when the monitored voltage is below an upper turn-on threshold, UTOT, but is above a lower turn-on threshold, LTOT, then discriminating between standalone and external power modes, comprising:
       when the device is operating in standalone mode:
           automatically turning the device off; and
           enabling the device to be turned on in an emergency mode, wherein at least one emergency action is enabled and other device actions are disabled; and
       when the device is operating in external power mode:
           enabling the device to be turned on; and
           enabling all device actions when the device is turned on; and
   when the monitored voltage is below the lower turn-on threshold (LTOT) but is above a power-on reset threshold, POR, then further discriminating between standalone and external power modes, comprising:
       when the device is operating in standalone mode:
           automatically turning the device off; and
           preventing the device from being turned on; and
       when the device is operating in external power mode:
           enabling all device actions if the device is already turned on; and
           preventing the device from being turned on when the device is turned off.

2. The method of claim 1 wherein the mobile electronic device is a cellular telephone, and wherein the at least one emergency action comprises making an emergency phone call.

3. The method of claim 1 wherein the mobile electronic device is a cellular telephone, and wherein the at least one emergency action comprises making a speed dial phone call.

4. The method of claim 1 wherein the power-on reset threshold (POR) is approximately 2.7V, the lower turn-on threshold (LTOT) is approximately 3.2V, and the upper turn-on threshold (UTOT) is approximately 3.3V.

5. A power management system for a mobile electronic device, comprising:
   a microprocessor for continually monitoring a voltage of a battery within a mobile electronic device, wherein the device can operate in either a standalone mode powered by the battery, or in an externally powered mode, and wherein the battery is charged when the device is in external power mode; and a power manager coupled with said microprocessor, for controlling operation of the device according to the following logic:
  when the monitored voltage is below an upper turn-on threshold, UTOT, but is above a lower turn-on threshold, LTOT, then discriminating between standalone and external power modes, comprising:
    when the device is operating in standalone mode:
      automatically turning the device off; and
      enabling the device to be turned on in an emergency mode, wherein at least one emergency action is enabled and other device actions are disabled; and
    when the device is operating in external power mode:
      enabling the device to be turned on; and
      enabling all device actions when the device is turned on; and
  when the monitored voltage is below the lower turn-on threshold (LTOT) but is above a power-on reset threshold, POR, then further discriminating between standalone and external power modes, comprising:
    when the device is operating in standalone mode:
      automatically turning the device off; and
      preventing the device from being turned on; and
    when the device is operating in external power mode:
      enabling all device actions if the device is already turned on; and
      preventing the device from being turned on when the device is turned off.

6. The power management system of claim 5 wherein the mobile electronic device is a cellular telephone, and wherein the at least one emergency action comprises making an emergency phone call.

7. The power management system of claim 5 wherein the mobile electronic device is a cellular telephone, and wherein the at least one emergency action comprises making a speed dial phone call.

8. The power management system of claim 5 wherein the power-on reset threshold (POR) is approximately 2.7V, the lower turn-on threshold (LTOT) is approximately 3.2V, and the upper turn-on threshold (UTOT) is approximately 3.3V.

* * * * *